United States Patent [19]

Peterson et al.

[11] 4,330,211
[45] May 18, 1982

[54] METHOD AND APPARATUS FOR DETECTING SMALL ANGULAR BEAM DEVIATIONS

[75] Inventors: Phillip R. Peterson; Athanasios Gavrielides, both of Albuquerque, N. Mex.; John H. Erkkila, Dayton, Ohio

[73] Assignee: The United States of America as represented by the Secretary of the Air Force, Washington, D.C.

[21] Appl. No.: 128,344

[22] Filed: Mar. 7, 1980

[51] Int. Cl.$^3$ .............................................. G01B 9/02
[52] U.S. Cl. ................................ 356/354; 350/162 R; 356/363
[58] Field of Search ................ 356/354, 355, 356, 363

[56] References Cited

U.S. PATENT DOCUMENTS

| | | | |
|---|---|---|---|
| 3,549,239 | 12/1970 | Brienza et al. | 356/354 X |
| 3,726,595 | 4/1973 | Matsumoto | 356/356 |
| 3,845,409 | 10/1974 | Wada et al. | 350/162 R X |
| 3,861,801 | 1/1975 | Peters et al. | 350/162 R X |
| 3,992,099 | 11/1976 | Laughlin | 356/73 |

OTHER PUBLICATIONS

Palmer et al., "Parallel Diffraction Grating Anomalies", *JOSA,* vol. 42, No. 4, pp. 269–276, 4/52.
Palmer et al., "Diffraction Grating Anomalies, II, Coarse Gratings", *JOSA,* vol. 46, No. 1, pp. 50–53, 1/56.
Hessel et al., "A New Theory of Wood's Anomalies on Optical Background Information Gratings", *Applied Optics,* vol. 4, No. 10, pp. 1275–1297, 10/65.

*Primary Examiner*—John K. Corbin
*Assistant Examiner*—Matthew W. Koren
*Attorney, Agent, or Firm*—Donald J. Singer; Jacob N. Erlich

[57] ABSTRACT

A method and apparatus for detecting small angular deviations of an input beam which utilizes a pair of diffraction gratings in series, both of which are operating in the Wood's anomaly region. As a result, the output intensity of the doubly diffracted input beam is at a maximum. Any deviation from the Wood's anomaly region by the input beam will substantially reduce the intensity of the output. This intensity variance is detected and utilized as an indication of a small angular deviation of the input beam.

10 Claims, 5 Drawing Figures

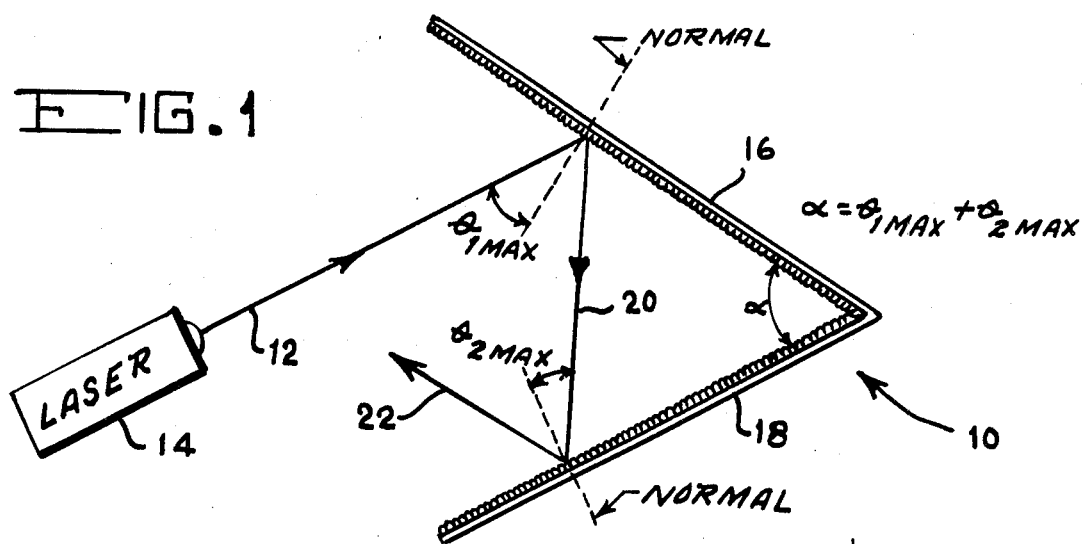
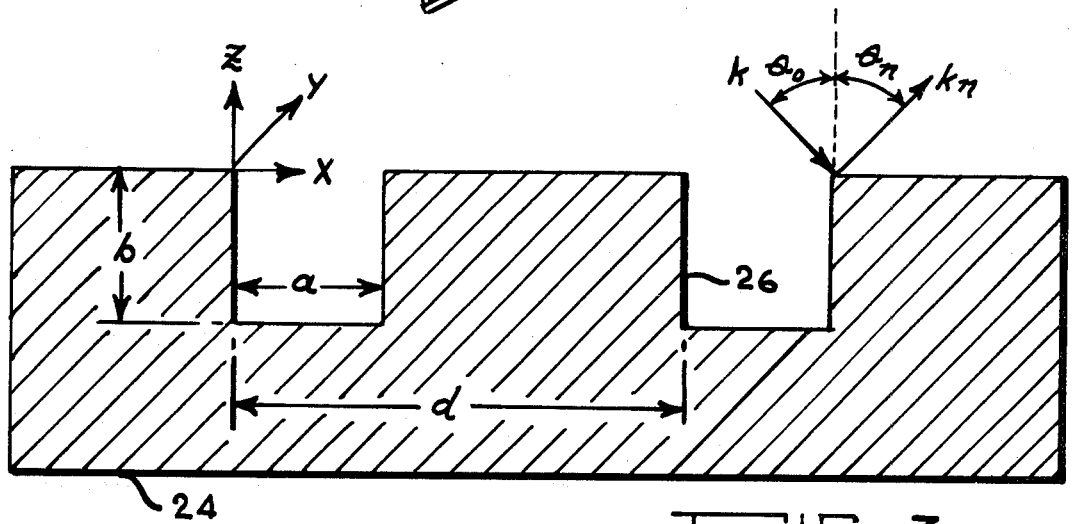
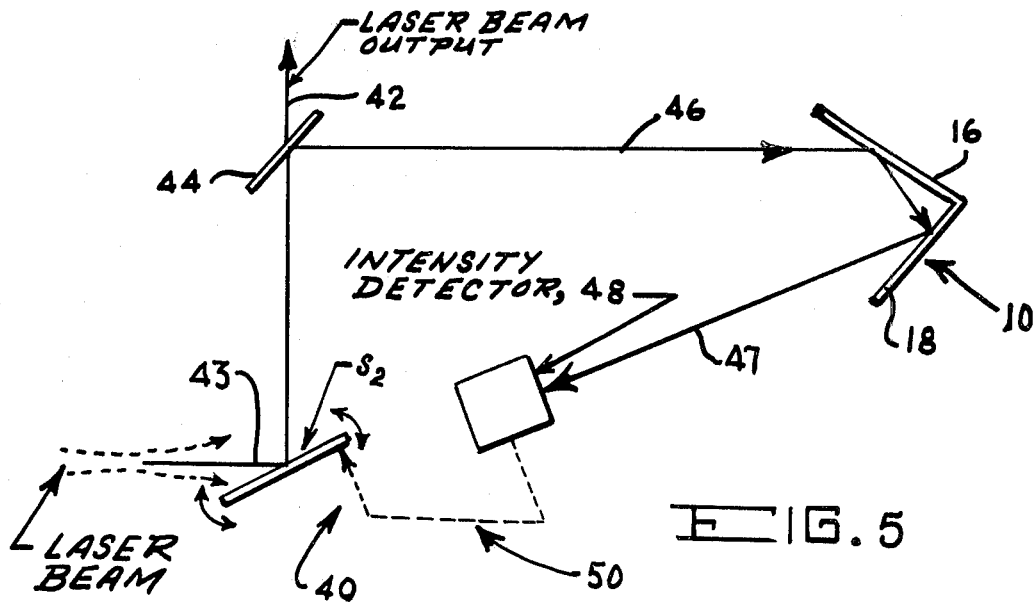

METHOD AND APPARATUS FOR DETECTING SMALL ANGULAR BEAM DEVIATIONS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to devices capable of detecting angular deviations of a beam, and, more particularly, to a method and apparatus which is capable of detecting small angular deviations of a beam in order to provide a more precise alignment of the beam.

In today's every increasing utilization of the laser, precise alignment of the laser beam relative to other optical elements and fixed reference members becomes essential. In addition, it is often necessary to continuously monitor and dynamically align such beam. For example, in laser beam pointing systems, it is also required to dynamically maintain the alignment of the collimated laser beam.

It is recognized that diffraction gratings can produce a rapid variation in the intensity of various diffracted orders of an incident beam in a narrow wavelength range and in a narrow range in the angle of incidence. This effect, the so called Wood's anomaly, is fully described within the following publications; Hessel, A. and Oliner, A., "A New Theory of Wood's Anomalies on Optical Gratings," *Applied Optics,* Vol. 4, No. 10, October 1965, pps 1275–1297; Palmer, C. Harvey, Jr., "Parallel Defraction Grating Anomalies," *Journal of the Optical Society of America,* Vol. 42, No. 4, April 1952, pps 269–276; and Palmer, C. Harvey, Jr., "Defraction Grating Anomalies, II. Course Gratings," *Journal of the Optical Society of America,.* Vol. 46, No. 1, January 1956, pps 50–53.

By detecting these changes in intensity (efficiency) of the diffracted beam one can ascertain if any angular deviation of the incident beam has taken place. Unfortunately, this change in intensity which occurs as a result of Wood's anomaly produces a curve of the relationship between diffraction efficiency (intensity) and angular incidence in which there is a gradual increase in efficiency to a maximum after which a rapid decrease in efficiency occurs. Consequently, small angular deviations of the incoming beam are extremely difficult to detect.

Therefore, a need arises for providing an apparatus for easily ascertaining even small angular deviations of a beam.

SUMMARY OF THE INVENTION

The instant invention overcomes the problems encountered in the past by providing a device which includes a pair of diffraction gratings in series in which both gratings operate in the vicinity of Wood's anomaly. As a result, the incident beam is doubly diffracted and the resultant intensity of the beam is very sensitive to small angular changes in the direction of the input beam.

The instant invention utilizes a pair of lamellar gratings in series in order to provide an output beam, the intensity of which (grating efficiency) will vary rapidly with small angular deviations of the input beam. In other words, with this invention the output beam intensity or grating efficiency will not only decrease rapidly but will also increase rapidly in direct response to small angular deviations of the input beam. In order to provide an output with maximum intensity (maximum grating efficiency) it is necessary to input a beam at an angle of incidence, $\theta_{max}$, with respect to a normal to the grating at a point where the efficiency of each grating is a maximum.

This can be accomplished by positioning the two gratings at a specific angular relationship with respect to each other. The angular relationship is defined as one in which the angle, $\alpha$, between gratings is equal to $\theta_{1max} + \theta_{2max}$ where $\theta_{1max}$ is the angle of incidence of an input beam with respect to a normal to the first grating at maximum grating efficiency and $\theta_{2max}$ is the angle of incidence of the diffracted beam from the first grating incident with respect to a normal to the second grating at maximum grating efficiency. In so doing, a curve representative of diffraction efficiency (intensity) versus angle of incidence of a beam with respect to a normal to the grating is produced such that a rapid increase in efficiency as well as a rapid decrease in efficiency is obtained by any angular deviation of the incident beam.

If, for example, the incident beam at each grating is deviated by an angle $\alpha$, then $\theta_1 = \theta_{1max} \mp \delta$, and $\theta_2 = \theta_{2max} \pm \delta$, respectively, since $\alpha = $ a constant $= \theta_{1max} + \theta_{2max}$, and the net output beam efficiency is the product of the grating efficiency or power $P_1$ at $\theta_1$ times the efficiency or power $P_2$ at $\theta_2$. Thus the product of $P_1(\theta_1) \times P_2(\theta_2) < P_1(\theta_{1max}) \times P_2(\theta_{2max})$. The net diffracted power or efficiency will be a sharply peaked function of $\delta$ about $\delta = 0$. Consequently, the sensitivity of the diffracted signal power or efficiency is responsive to small angular changes of the incident beam.

In addition by the utilization of a control system to continually maintain the doubly diffracted beam intensity or efficiency at a maximum the direction of an incoming beam can be maintained to a high degree of precision.

It is therefore an object of this invention to provide a device which is capable of detecting small angular deviations of a beam.

It is another object of this invention to provide a device which is capable of continually maintaining the precise angular alignment of an incoming beam.

It is still a further object of this invention to provide a method for detecting small angular deviations of a beam.

It is still a further object of this invention to provide a device for detecting small angular deviations of a beam which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a schematic representation of the device of this invention for detecting small angular deviations of a beam;

FIG. 3 is a side elevational view of a groove profile of a grating of the type utilized with this invention and shown partly in cross section;

FIG. 5 is a schematic representation of the device of this invention used within a system for maintaining an input beam within a desired input angle.

DETAILED DESCRIPTION OF THE PREFERRED EMBODIMENT

Figure 2:
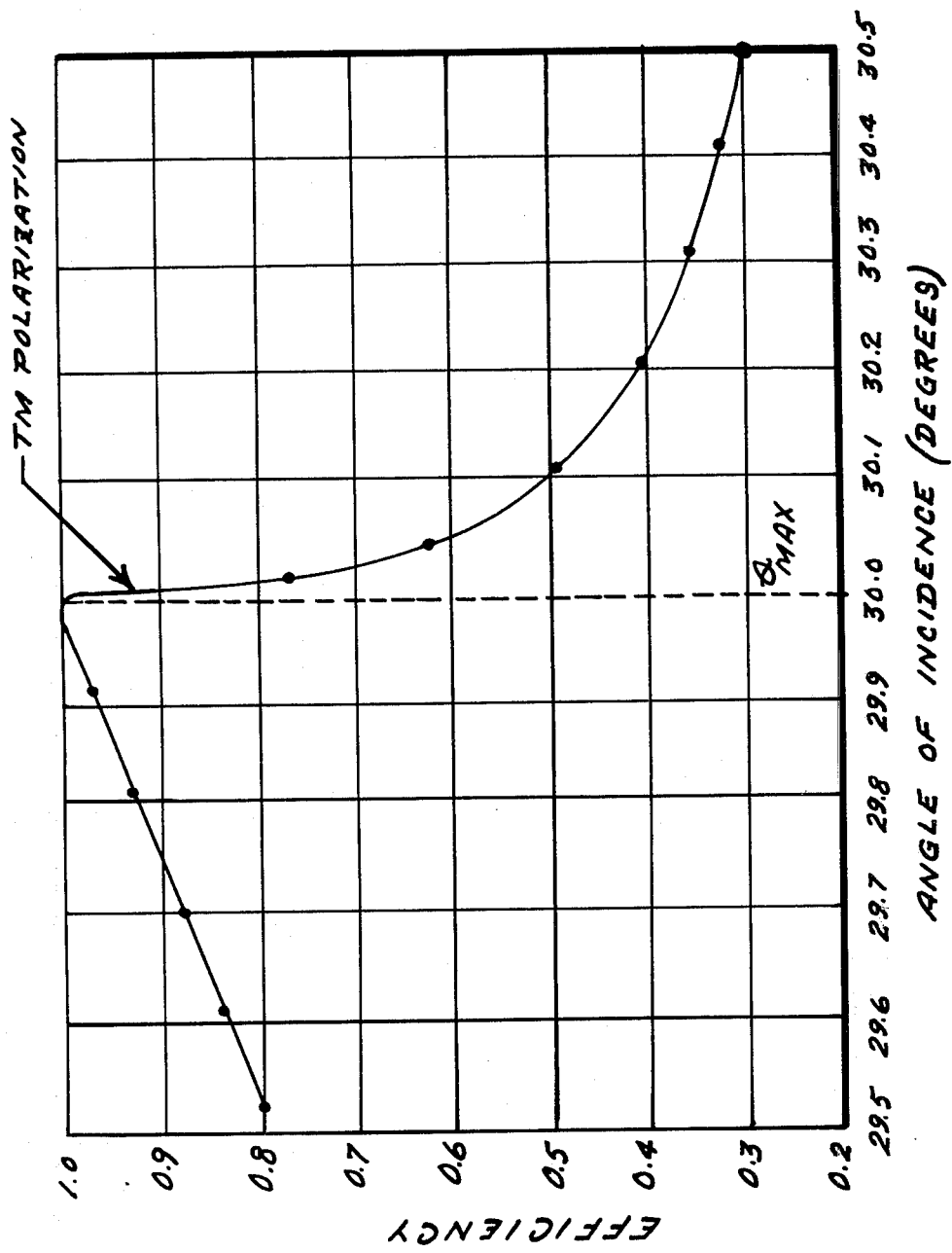
FIG. 2 is a graph representative of Wood's anomaly showing a comparison between diffraction efficiency (intensity) and angle of incidence.

Reference is now made to FIG. 1 of the drawing which shows in schematic fashion the apparatus or device 10 of this invention which is capable of detectig small angular deviations of an incoming beam 12. Beam 12, although preferably emanating from a suitable laser source 14 may be in the form of any beam of electromagnetic radiation in which a deviation from a desired input angle is to be detected.

Making up device 10 are a pair of diffraction gratings 16 and 18 which are joined together in series, that is, in which the angular displacement $\alpha$ between gratings 16 and 18 is such that an incoming beam 12 after being incident at a preselected angle on the first grating 16 is diffracted so as to be incident at a preselected angle on the second grating 18. By the utilization of a predetermined angle, $\alpha$, between gratings 16 and 18 and a predetermined angle, $\theta_{1max}$, for incident beam 12 with respect to a normal to grating 16 and a predetermined angle, $\theta_{2max}$, for the defracted beam 20 from grating 16 incident with respect to a normal at grating 18 at twice diffracted output beam 22 results. The grating efficiency or intensity of output beam 22 varies rapidly (both increases and decreases) with any small deviation in the angular displacement of input beam 12.

In order to determine the maximum grating efficiency for each grating 16 and 18, respectively, and thus the appropriate incident angles $\theta_{1max}$ and $\theta_{2max}$ an appropriate graph as shown in FIG. 2 of the drawing representative of output intensity (grating efficiency) versus angle of incidence, $\theta$, with respect to a normal to the grating is prepared.

An analysis for preparing the graph set forth in FIG. 2 of the drawing is set forth hereinbelow. This analysis can obtain an exact solution vector Helmholtz equation with the appropriate boundary condition. In so doing, information concerning the energy density in the groove as well as the diffraction performance of the grating can be obtained. Consequently, the following predictions can be made:

1. Diffraction efficiency (intensity) as a function of the three grating parameters (width, depth, period), angle of incidence, polarization, wavelength, and diffraction order.
2. Energy density in the groove.

Referring to FIG. 3 of the drawing, Maxwell's equation for a bare, perfectly conducting lamellar grating 24 is solved. This amounts to using plane wave solutions above grating 24 and solving the Helmholtz equation, subject to the appropriate boundary conditions in groove 26. These two solutions are then joined across the surface (x, y, z=0) by the use of boundary conditions. The vector plane wave solution has two eigenstates corresponding to the electric field or magnetic field polarized perpendicular to the plane of incidence.

In this analysis the plane of incidence is considered to be perpendicular to the groove profile, so the first case is Transverse Electric (TE) (the electric field parallel to the groove), and the second is Transverse Magnetic (TM) (the magnetic field parallel to the grooves). These two cases are solved independently hereinbelow with the general solution being a superposition of the TE and TM solutions. It should be noted that in order to be consistent the following notations are used throughout the equations:

x, y, z define the coordinate system
d = period
b = depth
a = width
$\theta_o$ = the angle of incidence with respect to a normal to the grating (positive to the left of the grating normal).
$\theta_n$ = the diffraction angle with respect to a normal to the grating (negative to the left of the normal)
k = incident beam
$k_n$ = diffracted beam

TRANSVERSE ELECTRIC

The incident electric field is assumed to have complex amplitude $E_o$ and is propagating in the k direction at an angle of incidence of $\theta_o$. The diffracted electric field is composed of a sum over complex Fourier amplitudes $A_n$ propagating in the direction $k_n$ at an angle $\theta_n$ as shown in FIG. 1. Thus, for $z \geq 0$ we have the solution $$E = E_o e^{i\beta_o x} e^{-\gamma_o zi} + \sum_{n=-\infty}^{+\infty} A_n e^{i\beta_n x} e^{i\gamma_n z} \qquad (1)$$

where $\beta_o = k \sin \theta_o$, $\gamma_o = k \cos \theta_o$ and $k = 2\pi/\gamma$. The periodicity (d) of the grating is contained in the grating equation $$\beta_n = k \sin \theta_n = \beta_o + \frac{2\pi n}{d} \qquad (2)$$

with $$\gamma_n = (k^2 - \gamma_n^2)^{\frac{1}{2}} \quad |\sin \theta_n| \leq 1 \qquad (3)$$
$$= i(\beta_n^2 - k^2)^{\frac{1}{2}} \quad |\sin \theta_n| > 1$$

Equation (3) ensures that the evanescent waves decay away from the surface. We have also assumed the standard time dependence of exp $(-i\omega t)$.

The solution in the groove has to satisfy the boundary conditions that E tangential vanishes on the surfaces x=0, a and z=−b, and that it is continuous across z=0. Thus, the electric field has only a y component and a magnitude $$E_g = \sum_{m=1}^{\infty} B_m \sin \frac{m\pi x}{a} [e^{-i\gamma_m z} - +2i\gamma_m b e^{+i\gamma_m z}] \qquad (4)$$

where b is the groove height and the separation constant $\gamma_m$ is related to the groove width a by $$\gamma_m = \left[ k^2 - \left( \frac{m\pi}{a} \right)^2 \right]^{\frac{1}{2}} \quad k \geq \frac{m\pi}{a} \qquad (5)$$

-continued $$\gamma_m = i\left[\left(\frac{m\pi}{a}\right)^2 - k^2\right]^{\frac{1}{2}} \frac{m\pi}{a} > k$$

with $\gamma_m$ imaginary representing the evanescent wave in the z-direction. Note that the m=0 solution is not allowed. The complex expansion coefficients $B_m$ are linked to the $A_n$'s by the boundary conditions along the z=0 surface.

The tangential electric field plane wave solutions at z=0 are $$E(x,o) = E_o e^{i\beta_o x} + \sum_n A_n e^{i\beta_n x} \quad 0 \leq x \leq a \qquad (6)$$

and $$E(x,o) = E_o e^{i\beta_o x} + \sum_n A_n e^{i\beta_n x} = 0 \quad a < x \leq d$$

and the tangential electric field for z<0 at the z=0 surface is $$E_g(x,o) = \sum_m B_m \sin\frac{m\pi x}{a}(1 - e^{2i\gamma_m b}) \quad 0 \leq x \leq a \qquad (7)$$

and $$0 \quad a < x \leq d$$

since for x:[a,d] the field is zero in the conductor. Setting equations (6) and (7) equal, then multiplying by $$\int_0^d e^{-i\beta_l x}$$

and using the orthogonality of the exponentials on the interval (o, d) leads to the projection of $A_n$ $$A_n = \qquad (8)$$

$$\frac{1}{d}\sum_{m=1}^{\infty} B_m \frac{[1 - e^{+2i\lambda_m b}]\frac{m\pi}{a}[1 + (-1)^{m+1}e^{-i\beta_n a}]}{\frac{(m\pi)^2}{a} - \beta_n^2} - E_o \delta_{on}$$

The values of the tangential magnetic fields on the z=0 surface are $$H_x = \frac{i}{\omega\mu}\frac{\partial E}{\partial z}\bigg|_{z=0} \quad 0 \leq x \leq a \qquad (9)$$

$$H_x = j_s \,|\, z=0 \quad a < x \leq d$$

and $$H_x = \frac{i}{\omega\mu}\frac{\partial E_g}{\partial z}\bigg|_{z=0} \quad 0 \leq x \leq a \qquad (10)$$

$$= 0 \quad a < x \leq d$$

where $j_s$ is the surface current density. Setting equation (10) and (11) equal, multiplying by sin $l\pi x/a$ and integrating x:[o,a] leads to $$B_m = \frac{2m\pi}{a^2\lambda_m}\frac{1}{[1+e^{2i\lambda_m b}]}\left\{\sum_n \frac{\gamma_n A_n[1+(-1)^{m+1}e^{i\beta_n a}]}{\beta_n^2 - \frac{(m\pi)^2}{a}} + \frac{E_o \gamma_o[1+(-1)^{m+1}e^{i\beta_o a}]}{\frac{(m\pi)^2}{a} - \beta_o^2}\right\} \qquad (11)$$

Combining equations (8) and (11) gives the matrix equation $$A_n - \sum_{s=-\infty}^{+\infty} T_{sn} A_s = R_n \quad -\infty \leq n \leq +\infty \qquad (12)$$

where $$T_{sn} = \sum_{m=1}^{\infty} Q_{sm} M_{mn} \qquad (13)$$

$$R_n = -\sum_{m=1}^{\infty} X_m M_{mn} - E_o \delta_{on} \qquad (14)$$

with $$Q_{nm} = \frac{2m}{a^2[1+e^{2i\lambda_m b}]} \frac{\gamma_n[1+(-1)^{m+1}e^{+i\beta_n a}]}{\lambda_m\left[\beta_n^2 - \left(\frac{m\pi}{a}\right)^2\right]} \qquad (15)$$

$$M_{mn} = \frac{\pi}{ad}\frac{[1-e^{2i\lambda_m b}]m[1+(-1)^{m+1}e^{-i\beta_n a}]}{-\beta_n^2 + \frac{(m\pi)^2}{a}} \qquad (16)$$

$$X_m = \frac{E_o \gamma_o[1+(-1)^{m+1}e^{i\beta_o a}]}{\beta_o^2 - \frac{(m\pi)^2}{a}} \frac{2m\pi/a^2}{\lambda_m[1+e^{2i\lambda_m b}]} \qquad (17)$$

The solution to TE diffraction is obtained by solving the matrix equation (12) for the amplitudes $A_n$.

TRANSVERSE MAGNETIC

For the TM case the plane wave solution for the magnetic field above the grating is $$H_y = H_o e^{i\beta_o x} e^{-i\gamma_o z} + \sum_n H_n e^{i\beta_n x} e^{i\gamma_n z} \qquad (18)$$

$$\overline{E} = (i\omega)^{-1} \nabla \times \overline{H}$$

along with equations (2) and (3). The solution in the groove is a superposition of sin $m\pi x/a$ and cos $m\pi x/a$ for the x solution and a superposition of $e^{\pm i\lambda_m z}$ for the z solution. Since there are no normal components of the magnetic field, the boundary conditions on E tangential are used. Thus, conditions are placed on the derivative of the magnetic field. It is easily shown that the solution in the groove for TM field is $$H_g = \sum_{m=0}^{\infty} B_m \cos\frac{m\pi x}{a}[e^{-i\lambda_m z} + e^{2i\lambda_m b}d^{+i\lambda_m z}] \qquad (19)$$

along with equation (5). Note that here the m=0 solution is allowed. One now forms the boundary conditions on E and H tangential just as in the TE case. Following the analogous steps we arrive at the matrix equation (12) with $$T_{sn} = \sum_{m=0}^{\infty} Q_{sm} M_{mn} \qquad (20)$$

-continued $$R_n = \sum_{m=0}^{\infty} X_m M_{mn} H_o \delta_{on} \quad (21)$$

where $$Q_{sm} = \frac{i\beta_n[1 + (-1)^{m+1} e^{i\beta_n a}]}{\left(\dfrac{a}{2}\right)[1 + e^{2i\lambda_m b}]\left[\beta_n^2 - \left(\dfrac{m\pi}{a}\right)^2\right]} \quad (22)$$

$$M_{mn} = \frac{i}{d} \frac{\beta_n}{\lambda_n} \frac{m[1 - e^{2i\lambda_m b}][1 + (-1)^{m+1} e^{i\beta_n a}]}{\left(\dfrac{m\pi}{a}\right)^2 - \beta_n^2} \quad (23)$$

$$X_m = \frac{i}{\left(\dfrac{a}{d}\right)[1 + e^{2i\lambda_m b}]} \frac{H_o \beta_o[1 + (-1)^{m+1} e^{i\beta_o a}]}{\beta_o^2 - \left(\dfrac{m\pi}{a}\right)^2} \quad (24)$$

for $m = \theta$. For $m=0$, the coefficient $(a/2)$ should be replaced by $a$, due to the orthogonality of $\cos m\pi x/a$.

By way of completing the physics, since the grating 24 is a perfect conductor the rate at which energy crosses the surface of the grating is conserved. This is formulated by setting the normal component of the incident Poynting vector equal to the sum of the normal components of the diffracted Poynting vectors. For $|E_o|^2 = 1$ this is expressed as $$\sum_n |A_n|^2 \frac{\lambda_n}{\lambda_o} = 1 \quad (25)$$

where the sum is over all n for which $\gamma_n$ is real.

NUMERICAL SOLUTION

Equation (12) is an infinite number of complex linear equations with $A_n$ as unknowns and the coefficients $T_{sn}$ being infinite sums over the groove index m. The solution is to arbitrarily truncate the number of equations as well as the sum over m. Next, the matrix is inverted and we solve for $A_n$. The size of the array and the number of terms in $T_{sn}$ are determined by the convergence of $A_n$ to within 0.001. The criterion can be easily satisfied by using an array which contains the first 10 orders; i.e., $-10 \leq n \leq 10$, and a maximum m of about 40. In fact, many cases converge with fewer terms. It should be noted that in all cases, either TE or TM, the energy equation (25) is satisfied to within 1 part in $10^6$.

RESULTS

Final calculations yield the energy density, E(x, z), in the grooves. This is obtained by using equations (1) and (4) for TE polarization, and equations (18) and (19) for TM polarization, in combination with Maxwell's equations and $E(x, z) = [\epsilon E^2 + \mu B^2]/2$.

As shown above, there are two independent solutions for the diffracted power lamllar gratings, depending on the two independent polarization direction of the incident beam, that is, the Transverse Electric (TE) and the Transverse Magnetic (TM). For the instant invention utilizing the Wood's anomaly the Transverse Magnetic state has been chosen. This is because the anomalies are sharper for TM than for TE.

If, for example, we pick an arbitrary wavelength 10.6 m and an angle of incidence of 30° we can employ equation (2) to find a value of the period ($d = 14.13$ $\mu$m when the number of orders change $n = -2, -1, 0$ $n = -1, 0$). Thus we should be in a Wood's anomaly region. Next we arbitrarily chose a depth ($b = 6$ $\mu$m), and a width ($a = 3$ $\mu$m) and the TM polarization case. We are now in a position to obtain the diffracted efficiencies. This is done by solving the matrix equation, equation (10), with the accompanying definition equations (2), (3), (5) and equations (20) through (24) for the above determined parameters. This gives the diffraction amplitudes $A_n$ for given $\lambda$, $\theta$, b, d, a. Next, we vary the angle of incidence to obtain the diffraction efficiency $P_o(\theta) = |A_o(\theta)|^2$, for the $n=0$ order as a function of the angle of incidence in order to produce the graph shown in FIG. 2 of the drawing.

When two identical gratings 16 and 18 are in series as with this invention and as shown in FIG. 1 of the drawing the net output efficiency is the product of the output power or efficiency of beam 12 incident on grating 16 at $\theta_{1max} \mp \delta$ and the output power or efficiency of beam 20 incident on grating 18 at $\theta_{2max} \pm \delta$. In other words, $P_1(\theta_{1max} \mp \delta) \times P_2(\theta_{2max} \pm \delta) =$ output efficienty where $\delta$ is the deviation angle from $\theta_{max}$. Both of these functions have been found in the above analysis and are displayed in FIG. 2. Forming the product then gives FIG. 4, a representation of output efficiency for a doubly diffracted beam 22.

For example, suppose beams 12 and 20 are incident on gratings 16 and 18, respectively, at maximum grating efficiency, i.e., $\theta_{1max}$ and $\theta_{2max}$. The resultant diffracted power attained is therefore at its maximum. If the incident beams are deviated by an angle, $\delta$, then $\theta_1 = \theta_{1max} \mp \delta$ and $\theta_2 = \theta_{2max} \pm \delta$. Since $\alpha =$ constant $= \theta_{1max} + \theta_{2max}$ it is readily apparent from the graph shown in FIG. 4 that the net diffracted power or the efficiency of the device 10 of this invention will be a sharply peaked function about $\delta = 0$. From this we find a change in intensity of 1% corresponds to a resolution angle of $\delta = 2.5 \times 10^{-4}$ deg $= 1/220$ mr. A change in 5% corresponds to a resolution angle of $\delta = 8 \times 10^4$ deg $= 1/70$ mr.

It should be noted, however, for simplicity, it has been assumed that gratings 16 and 18 are identical, however, if different gratings were used in this invention and operated at separate $\theta_{max}$ the net efficiency will not be a symmetric function of $\delta$ and the sensitivity would decrease.

FIG. 5 illustrates an alignment system 40 using the Wood's anomoly alignment sensing apparatus 10 of this invention. The object of alignment system 40 would be to keep an output laser beam 42 or any other suitable beam of electromagnetic radiation pointing in a fixed direction, even though, the laser beam 43 may change in direction. This is accomplish by splitting input beam 43 by any conventional optical arrangement such as beam splitter 44 optically aligned with beam 43 and sampling a portion thereof, beam 46, with the apparatus 10 of this invention.

Figure 4:
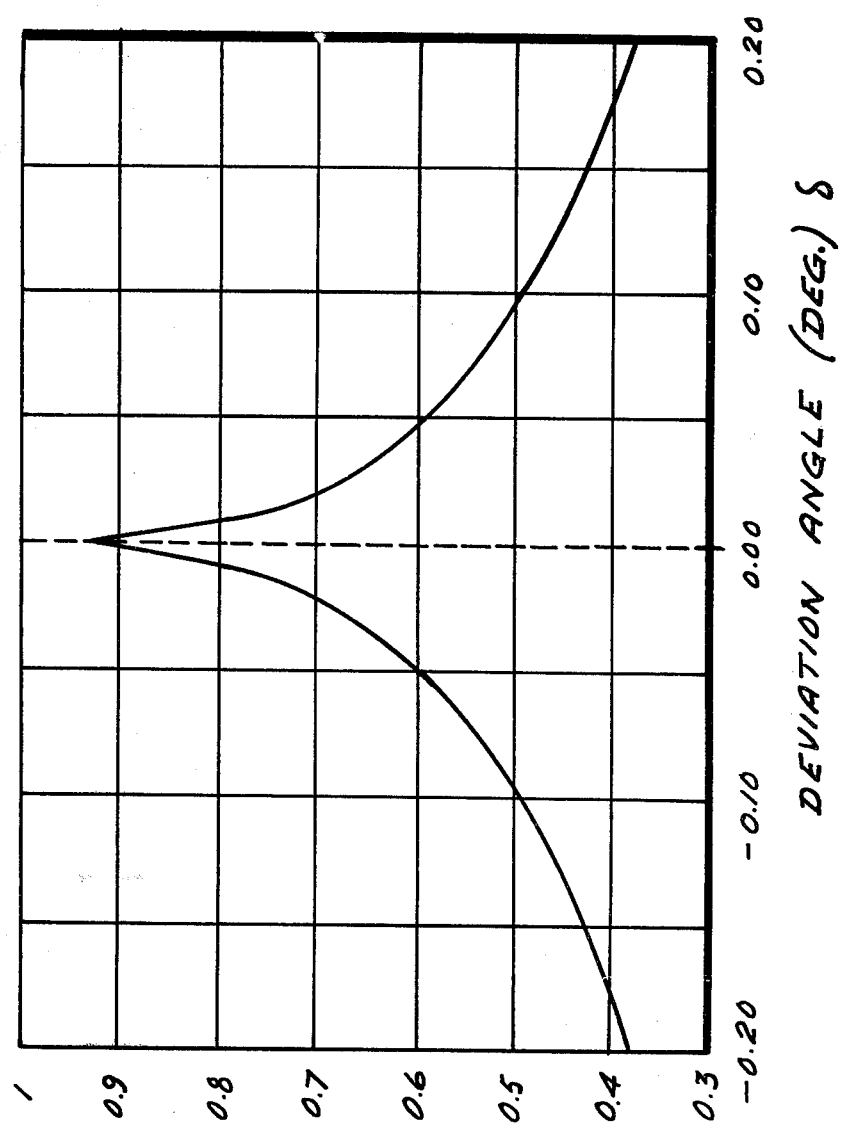
FIG. 4 is a graph representative of Wood's anomaly when utilized with the device of this invention and displaying a relationship between efficiency (intensity) and deviation angle.

For example, suppose beam 42 is aligned such that a portion thereof, beam 46 is doubly diffracted off gratings 16 and 18 at a point where the grating efficiencies are at a maximum, that is, $\theta_{1max}$ and $\theta_{2max}$. The output portion 47 of beam 46 would be at maximum power or intensity. This power would be detected by any suitable intensity detector 48. Accordingly, the intensity peak (grating efficiency) could be determined from the graph of FIG. 4 where $\delta = 0$. Now, if input beam 42 changes direction the angle of incidence on gratings 16 and 18 will deviate by some angle $\delta$ and the intensity at detector 48 will decrease accordingly as illustrated in FIG. 4.

This decrease in intensity (grating efficiency) triggers a conventional feedback circuit 50 which rotates a conventional tilt controlled mirror 52 until δ=0 and the intensity on detector 48 is again at a maximum. At this point output beam 42 is back to its proper direction.

By maintaining the intensity at a maximum by means of apparatus 10 of this invention, the direction of output beam 43 at beamsplitter 44 can be in precise alignment even through the input beam 42 varies as a function of time.

Although this invention has been described with reference to a particular embodiment, it will be understood to those skilled in the art that this invention is also capable of further and other embodiments within the spirit and scope of the appended claims.

We claim:

1. An apparatus for detecting small angular deviations of an input beam comprising:
   (a) a first diffraction grating, said first diffraction grating being positioned with respect to said input beam such that said input beam is incident on said first grating at an angle, $\theta_{1max}$, with respect to a normal to said first grating and wherein $\theta_{1max}$ is preselected such that said input beam is diffracted from said first grating at maximum intensity,
   (b) a second diffraction grating, said second diffraction grating being positioned at a preselected angle, $\alpha$, with respect to said first diffraction grating such that said diffracted beam from said first grating is incident on said second grating at an angle, $\theta_{2max}$, with respect to a normal to said second grating and wherein $\theta_{2max}$ is preselected such that said diffracted beam on said second grating is diffracted from said second at maximum intensity and $\alpha = \theta_{1max} + \theta_{2max}$,
   whereby any small deviations of said input beam produces a large variance in said intensity of said beam diffracted from said second grating.

2. An apparatus for detecting small angular deviations of an input beam as defined in claim 1 wherein said first and said second gratings are substantially identical.

3. An apparatus for detecting small angular deviations of an input beam as defined in claim 2 further comprising means in optical alignment with said beam diffracted from said second grating for detecting the intensity thereof.

4. A beam alignment system comprising means for providing an input beam of electromagnetic radiation, means optically aligned with said beam for directing a portion thereof in one direction as an output beam and directing the other portion thereof in another direction, a first diffraction grating optically aligned with said other portion of said input beam, said first diffraction grating being positioned with respect to said other portion of said input beam such that said other portion of said input beam is incident on said first grating at an angle, $\theta_{1max}$, with respect to a normal to said first grating and wherein $\theta_{1max}$ is preselected such that said other portion of said input beam is diffracted from said first grating at maximum intensity, a second diffraction grating, said second diffraction grating being positioned at a preselected angle, $\alpha$, with respect to said first diffraction grating such that said diffracted beam from said first grating is incident on said second grating at an angle, $\theta_{2max}$, with respect to a normal to said second grating and wherein $\theta_{2max}$ is preselected such that said diffracted beam on said second grating is diffracted from said second grating at maximum intensity and $\alpha = \theta_{1max} + \theta_{2max}$, means optically aligned with said beam diffracted from said second grating for detecting the intensity thereof and providing a signal in accordance therewith, means optically interposed between said input beam and said directing means for varying the input angle of said input beam, said intensity detecting means operably connected to said angle varying means for adjusting said angle varying means in accordance with said signal from said intensity detecting means, whereby said angle varying means is adjustable so as to maintain said other portion of said input beam incident on said first and said second gratings at $\theta_{1max}$ and $\theta_{2max}$, respectively, and the detected intensity is maintained at a maximum thereby providing an output beam in substantially constant alignment.

5. A beam alignment system as defined in claim 4 wherein said first and said second gratings are substantially identical.

6. A beam alignment system as defined in claim 5 wherein said beam directing means is a beam splitter.

7. A beam alignment system as defined in claim 6 wherein said angle varying means is an adjustable mirror.

8. A beam alignment system as defined in claim 7 wherein said means for providing said input beam is a laser.

9. A method of detecting small angular deviations of an input beam comprising the steps of:
   (a) aligning a first diffraction grating with said input beam such that said input beam is incident on said first grating at an angle, $\theta_{1max}$, with respect to a normal to said first grating and wherein $\theta_{1max}$ is preselected such that said input beam is diffracted from said first grating at maximum intensity,
   (b) aligning a second diffraction grating at a preselected angle, $\alpha$, with respect to said first diffraction grating such that said diffracted beam from said first grating is incident on said second grating at an angle, $\theta_{2max}$, with respect to a normal to said second grating and wherein $\theta_{2max}$ is preselected such that said diffracted beam on said second grating is diffracted from said second grating at maximum intensity and $\alpha = \theta_{1max} + \theta_{2max}$,
   whereby any small angular deviations in said input beams substantially reduces said intensity of said beam diffracted from said second diffraction grating.

10. A method of detecting small angular deviations of an input beam as defined in claim 9 wherein said first and said second gratings are substantially identical.

* * * * *